United States Patent
Miyaoka

[11] Patent Number: 6,058,077
[45] Date of Patent: *May 2, 2000

[54] SIGNAL REPRODUCING METHOD AND APPARATUS FOR REPRODUCING INFORMATION BY MOVING MAGNETIC WALL

[75] Inventor: Yasuyuki Miyaoka, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/933,054

[22] Filed: Sep. 18, 1997

[30] Foreign Application Priority Data

Sep. 19, 1996 [JP] Japan ................................ 8-247706

[51] Int. Cl.$^7$ ........................................ G11B 11/00
[52] U.S. Cl. .................................... 369/13; 369/116
[58] Field of Search ................... 369/13, 54, 14, 369/116, 110; 300/59, 114; 365/122; 428/694 ML, 694 MM

[56] References Cited

U.S. PATENT DOCUMENTS

| | | | |
|---|---|---|---|
| 5,091,897 | 2/1992 | Otokawa et al. | 369/13 |
| 5,233,578 | 8/1993 | Yamamoto et al. | 369/13 |
| 5,353,266 | 10/1994 | Fujii | 369/13 |
| 5,398,227 | 3/1995 | Miyaoka et al. | 369/116 |
| 5,428,586 | 6/1995 | Kobayashi et al. | 369/13 |
| 5,587,975 | 12/1996 | Kobayashi | 369/13 |
| 5,621,706 | 4/1997 | Kawano et al. | 369/13 |
| 5,629,909 | 5/1997 | Shiratori | 369/13 |
| 5,740,133 | 4/1998 | Tamanoi et al. | 369/13 |

FOREIGN PATENT DOCUMENTS 6-290496  10/1994  Japan .

*Primary Examiner*—Tan Dinh
*Attorney, Agent, or Firm*—Fitzpatrick, Cella, Harper & Scinto

[57] ABSTRACT

In a signal reproducing apparatus, information is reproduced by moving a magnetic wall on a magnetic recording medium as follows. A temperature profiled is given the medium by using a light beam so as to detect a first reproduction signal $h(t)=f(t)+\alpha*f(t-\beta)$ containing both a signal component $f(t)$ obtained by a first backward magnetic wall movement toward a temperature peak position in the temperature profile and a signal component $\alpha*f(t-\beta)$ obtained by a second forward magnetic wall movement toward the temperature peak position. The power of the light beam is adjusted so that a delay amount $\beta$ is essentially an integer multiple of a recording code channel interval Tb. An amplitude ratio $\alpha$ is detected. A slice level is set in accordance with the detected amplitude ratio $\alpha$ so as to reproduce the information by comparing the first reproduction signal with the slice level.

9 Claims, 12 Drawing Sheets

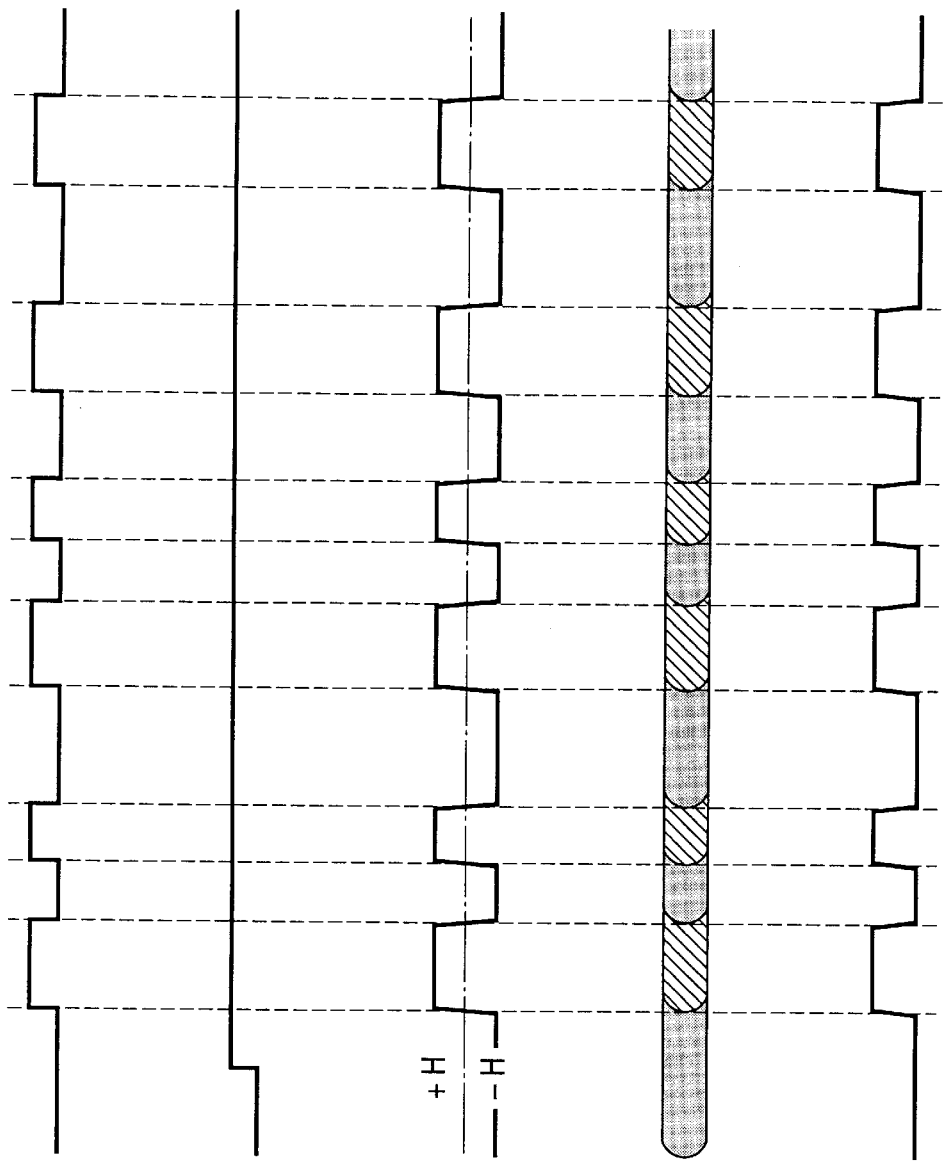
FIG. 4A PRIOR ART RECORDING SIGNAL
FIG. 4B PRIOR ART RECORDING POWER
FIG. 4C PRIOR ART MODULATED MAGNETIC FIELD
FIG. 4D PRIOR ART RECORDING MARK
FIG. 4E PRIOR ART REPRODUCTION SIGNAL

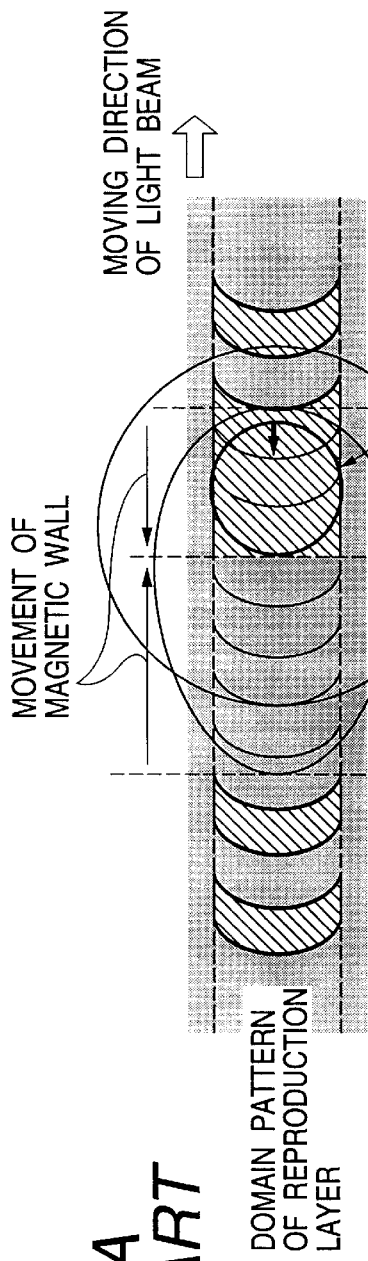
FIG. 5A
PRIOR ART
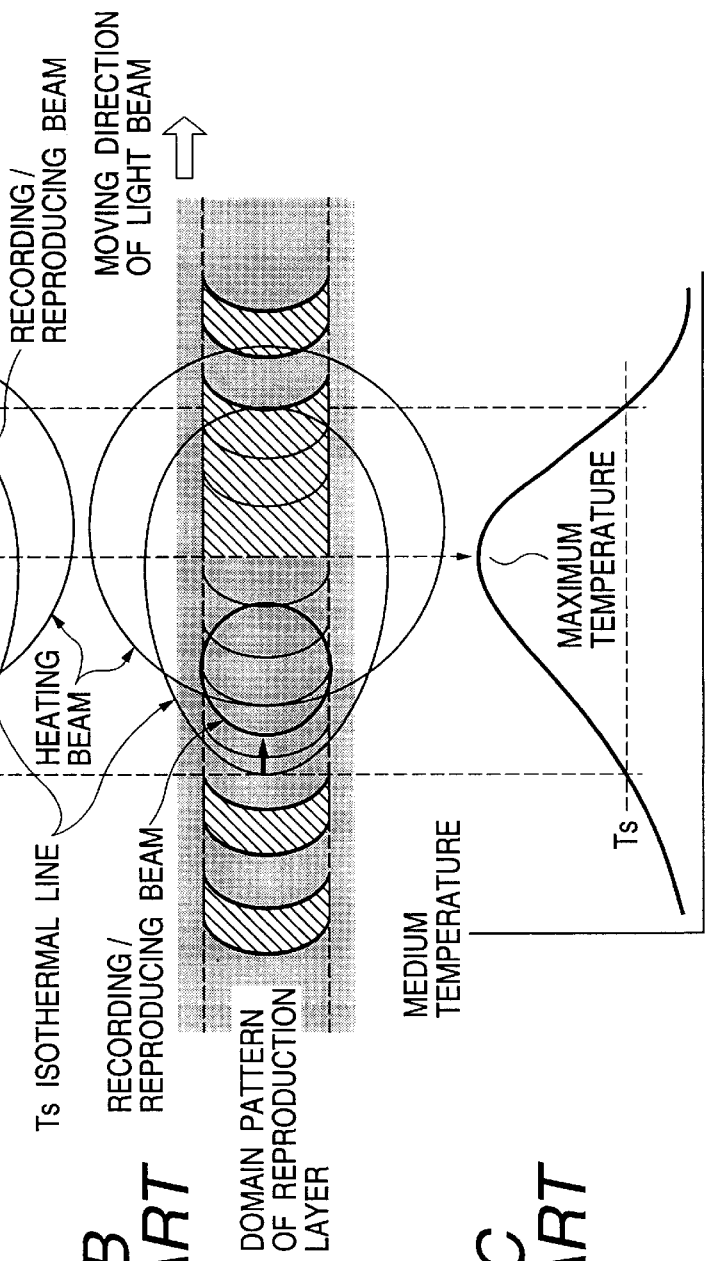
FIG. 5B
PRIOR ART
FIG. 5C
PRIOR ART

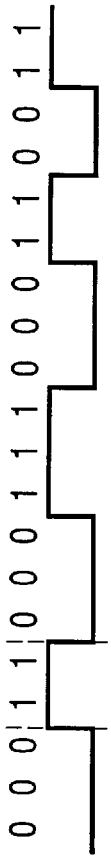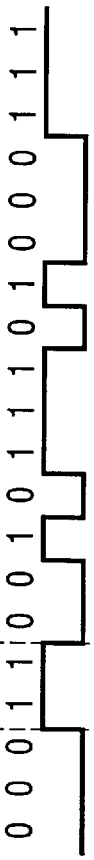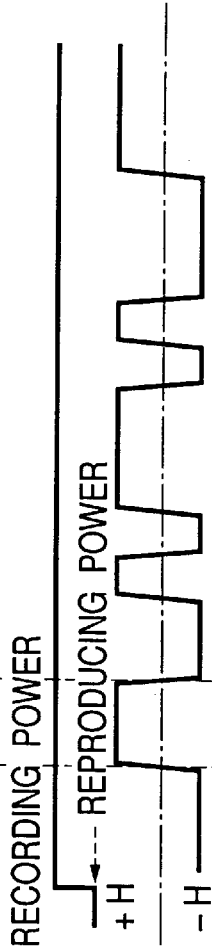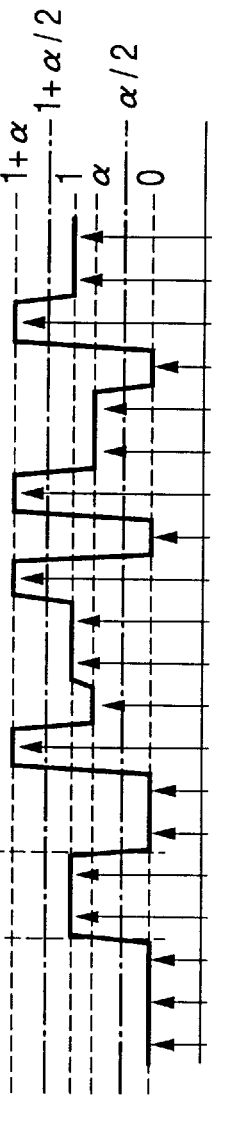
FIG. 8A  DATA SYSTEM STRING ($a_k$)
FIG. 8B  RECORDING SIGNAL SYSTEM STRING ($b_k$)
FIG. 8C  RECORDING POWER
FIG. 8D  MODULATED MAGNETIC FIELD
FIG. 8E  RECORDING MARK
FIG. 8F  REPRODUCTION SIGNAL
FIG. 8G  SAMPLING POINT
FIG. 8H  SAMPLING POINT SIGNAL STRING
FIG. 8I  REPRODUCTION DATA STRING

SIGNAL REPRODUCING METHOD AND APPARATUS FOR REPRODUCING INFORMATION BY MOVING MAGNETIC WALL

BACKGROUND OF THE INVENTION

1. Field of the Invention

The present invention relates to a signal reproducing method and apparatus capable of irradiating a light beam on a magneto-optical recording medium having a multilayered structure, moving magnetic walls of a recording mark in a reproduction layer by using the temperature gradient of a temperature profile with respect to a magnetic domain without changing recorded data in a recording layer, detecting a change in the plane of polarization of the reflected light of the light beam, and reproducing the recording mark smaller than the diffraction limit of the light beam.

2. Related Background Art

One example of rewritable high-density recording media is a magneto-optical recording medium by which information is recorded by writing a magnetic domain in a thin magnetic film by using thermal energy of a semiconductor laser and read out by using a magneto-optical effect. Recently, it is being increasingly demanded to further increase the recording density of this magneto-optical recording medium to obtain a large-capacity recording medium. The linear recording density of an optical disk such as a magneto-optical recording medium largely depends upon the laser wavelength of a reproducing optical system and the numerical aperture of an objective lens. That is, the diameter of a beam waist is determined when a laser wavelength $\lambda$ of a reproducing optical system and a numerical aperture NA of an objective lens are determined. The detectable band of a spatial frequency during reproduction of a recording mark is at most $2NA/\lambda$, and this is an optical diffraction limit. Therefore, to realize a high density by using a conventional optical disk, it is necessary to shorten the laser wavelength of a reproducing optical system and increase the NA of an objective lens. However, improvements of the laser wavelength and the numerical aperture of an objective lens also have their limits. For this reason, it is being attempted to develop a technique which increases the recording density by improving the arrangement of a recording medium or a read method.

For example, Japanese Laid-Open Patent Application No. 06-290496 has proposed a signal reproducing method and apparatus which operate as follows. That is, signal recording is performed in a recording holding layer of a multilayered film including a reproduction layer and the recording holding layer, which are magnetically coupled with each other, and having different Curie temperatures. Magnetic walls of a recording mark in the reproduction layer are moved by using a temperature gradient caused by irradiation of a heating light beam without changing the recorded data in the recording holding layer. The reproduction layer is magnetized such that the directions of magnetization are aligned in a nearly entire area of a reproducing light beam spot. A change in the plane of polarization of the reflected light of the reproducing light beam is detected, and thereby the recording mark smaller than the diffraction limit of the reproducing light beam is reproduced.

FIGS. 5A and 5B show the relationships between a large circular heating beam, a small circular recording/reproducing beam in the heating beam, and an oval $T_s$ isothermal line corresponding to the beam moving velocity during reproduction in this method. When a recording mark shown in FIG. 4D is scanned and reproduced, the reproduction signal is a rectangular signal as shown in FIG. 4E. That is, it is possible to reproduce a recording mark with a period smaller than the diffraction limit of the light beam without decreasing the amplitude of a reproduction signal. Accordingly, a magneto-optical medium and a reproducing method capable of greatly improving the recording density and the transfer rate can be obtained.

FIG. 3 shows the arrangement of the prior art. Referring to FIG. 3, a magneto-optical disk 1 includes a substrate 2 made from glass or plastic, a magneto-optical recording medium 3 having three or four layers and adhered to the substrate 2, and a protective layer 4 formed on the magneto-optical recording medium 3. The magneto-optical recording medium 3 can move magnetic walls of a recording mark in a reproduction layer by using a temperature gradient caused by irradiation of a light beam without changing recorded data in a recording layer, align the directions of magnetization in a nearly entire area of a reproducing spot, detect a change in the plane of polarization of the reflected light of the light beam, and reproduce the recording mark. The magneto-optical disk 1 is supported by a spindle motor by means of, e.g., magnet chucking and can be rotated around a rotating shaft.

Elements 5 to 17 are parts constituting an optical head for irradiating laser light onto the magneto-optical disk 1 and obtaining information from the reflected light. The element 6 is a condenser lens, and the element 5 is an actuator for driving the condenser lens 6. The element 7 is a recording/reproducing semiconductor laser with a wavelength of 680 nm, and the element 8 is a heating semiconductor laser with a wavelength of 1.3 $\mu$m. The elements 9 and 10 are collimator lenses. The element 11 is a dichroic mirror for transmitting 100% of 680-nm light and reflecting 100% of 1.36-$\mu$m light. The element 12 is a beam splitter. The element 13 is a dichroic mirror which prevents 1.3-$\mu$m light from entering a signal detecting system. The dichroic mirror 13 does not transmit 1.3-$\mu$m light and transmits 100% of 680-nm light. The element 14 is a $\lambda/2$ plate, the element 15 is a deflection beam splitter, the elements 17 are photosensors, and the elements 16 are condenser lenses for the photosensors 17. A differential amplifier 18 differentially amplifies signals focused and detected in accordance with the deflecting directions.

In the magneto-optical recording/reproducing apparatus with the above arrangement, laser beams emitted from the recording/reproducing and heating semiconductor lasers 6 and 8 and having wavelengths of 680 nm and 1.3 $\mu$m are irradiated on the magneto-optical disk 1 via the collimator lenses 9 and 10, the dichroic mirror 11, the beam splitter 12, and the condenser lens 6. The condenser lens 6 is so controlled by the actuator 5 as to move in a focusing direction and a tracking direction to sequentially focus the laser beams on the magneto-optical recording medium 3 as a recording/reproducing laser and a heating laser. The condenser lens 6 also tracks along guide grooves formed on the magneto-optical disk. Additionally, a light beam system of the 1.3-$\mu$m light is so designed as to be smaller than the aperture diameter of the condenser lens 6. Therefore, the NA of the 1.3-$\mu$m light is smaller than that of the 680-nm light which is condensed through the entire aperture. Accordingly, as shown in FIGS. 5A to 5C, the heating spot of the heating beam has a long wavelength and a small NA and hence has a larger diameter than that of the recording/reproducing spot of the recording/reproducing beam. Consequently, as indicated by the moving direction of a light beam, a desired temperature gradient which gradually drops from the characteristic maximum temperature with respect to the medium temperature can be formed in a recording/reproducing spot region on the moving medium surface.

The optical paths of the laser beams reflected by the magneto-optical disk 1 are changed in the direction of the polarizing beam splitter 15 by the beam splitter 12. These light beams are focused on the photosensors 17 by the condenser lenses 16, in accordance with the polarity of magnetization in the magneto-optical recording medium, via the dichroic mirror 13, the λ/2 plate 14, and the polarizing beam splitter 15. Since the 1.3-μm light cannot transmit through the dichroic mirror 13, the heating light beam is intercepted, and the 680-nm light alone propagates after that. The differential amplifier 18 differentially amplifies the outputs from the photosensors 17 and outputs a magneto-optical signal.

A controller 20 inputs, of course, a recording signal to be recorded and also receives, e.g., the rotational speed, recording radius, and recording sector of the magneto-optical disk 1 as input information and outputs the recording power of the semiconductor laser 7 and the recording signal, thereby controlling an LD driver 19 and a magnetic head driver 24. The LD driver 19 drives the semiconductor lasers 7 and 8 and controls desired recording power, reproducing power, and heating beam power in this prior art.

A magnetic head 23 applies a modulated magnetic field to a laser irradiated portion of the magneto-optical disk during recording. The magnetic head 23 is arranged to oppose the condenser lens 6 with the magneto-optical disk 1 interposed between them. In recording, the recording/reproducing semiconductor laser 7 is driven by the LD driver 19 to irradiate the recording laser power by DC light. At the same time, the magnetic head 23 is driven by the magnetic head driver 24 to generate a magnetic field having a different polarity in accordance with a recording signal. Also, this magnetic head 23 moves in the radial direction of the magneto-optical disk 1 in synchronism with the optical head. In recording, the magnetic head 23 sequentially applies a magnetic field to laser irradiated portions of the magneto-optical recording medium 3, thereby recording information.

Recording and reproducing operations will be described below with reference to FIGS. 4A to 4E. FIG. 4A shows a recording signal. FIG. 4B shows a recording power of the semiconductor laser 7 for generating a recording/reproducing beam. FIG. 4C shows a modulated magnetic field generated by the magnetic head 23. FIG. 4D shows a recording mark formed on the magneto-optical disk 1. FIG. 4E shows a reproduction signal obtained from the differential amplifier 18. When a recording signal as shown in FIG. 4A is to be recorded, the laser power is set at a predetermined recording power at the start of a recording operation, and a modulated magnetic field based on the recording signal is applied. By these operations, the recording mark string shown in FIG. 4D is formed in the cooling process of the recording medium. Note that hatched portions represent magnetic domains having a direction of magnetization corresponding to the recording mark described in this specification, and halftone portions represent magnetic domains having an opposite direction of magnetization.

In a reproducing operation, as shown in FIGS. 5A to 5C, the heating beam from the heating semiconductor laser 8 performs heating until a temperature condition by which a magnetic wall in the reproduction layer of the magnetic wall movement moves is obtained. Under this temperature condition, an isothermal line of the recording medium temperature $T_s$ as a principal condition by which a magnetic wall starts moving exists in both before and after the beam along the beam moving direction. That is, one magnetic wall moves backward in the beam moving direction, and the other magnetic wall moves forward in the beam moving direction. Therefore, when the reproducing beam is arranged in the front portion along the beam moving direction as shown in FIG. 5A, only a magnetic wall movement signal from the front can be detected. Also, when the reproducing beam is arranged in the rear portion along the beam moving direction as shown in FIG. 5B, only a magnetic wall movement signal from the rear can be detected. FIG. 5C shows the temperature characteristic of the magnetic domain with respect to the temperature of the magneto-optical medium. Even a recording mark whose recording density is smaller than the optical diffraction limit as described above can be reproduced by using the temperature gradients on the two sides of the maximum temperature point.

In either of the cases shown in FIGS. 5A and 5B, the reproduction signal shown in FIG. 4E can be obtained by reproducing the recording mark string as shown in FIG. 4D by using the recording/reproducing beam. This reproduction signal in FIG. 4E faithfully reproduces the recording signal in FIG. 4A, so the information can be reproduced. In this method, as shown in FIGS. 5A to 5C, all magnetized states contained in the reproducing beam are the same. Therefore, the reproduction signal is a rectangular signal as shown in FIG. 4E, so a recording mark with a period smaller than the optical diffraction limit of the light beam can be reproduced without decreasing the amplitude of the reproduction signal. This realizes a magneto-optical medium and a reproducing method capable of greatly improving the recording density and the transfer rate.

In the above prior art, however, the use of the heating laser beam increases the number of optical parts and the number of adjustment steps during assembly of the apparatus. That is, the use of the two lasers increases various costs. To solve the problem of these increases in the costs, it is necessary to make a single light beam function as both a heating beam and a reproducing beam.

If the heating beam is omitted, however, as shown in FIG. 1, the maximum temperature point in a temperature rising region formed by the reproducing light beam is present in the reproducing light beam. Accordingly, a synthetic signal: $h(t)=f(t)+\alpha \times f(t-\beta)$ of a signal: f(t) generated when a magnetic wall moves from the front end of a magnetic movement critical temperature region, which is formed by the reproducing light beam, to the maximum temperature point and a signal: $\alpha \times f(t-\beta)$ generated when a magnetic wall moves from the rear end of the critical temperature region to the maximum temperature point is detected as a reproduction signal.

For example, when a recording signal string as shown in FIG. 2A is to be recorded and reproduced, recording marks are read out through states indicated by (I) to (IV) in FIG. 2B as a reproducing beam moves, and a reproduction signal as shown in FIG. 2C is obtained. As described above, the reproduction signal in FIG. 2C is a superposed signal of reproduction signal (I) obtained by magnetic wall movement from the front of the reproducing beam and reproduction signal (II) obtained by magnetic wall movement from the rear of the reproducing beam. In this case, therefore, the recorded information cannot be reproduced with a sufficient margin by a conventional method (FIG. 6) which performs binarization by a slice level of the median value of a repeating reproduction signal of the shortest mark.

SUMMARY OF THE INVENTION

It is an object of the present invention to provide a signal reproducing method and apparatus capable of accurately reproducing information with only a reproducing light beam without using any heating beam.

The above object is achieved by a signal reproducing apparatus for reproducing information by moving a magnetic wall on a magnetic recording medium, comprising:

reproducing means for giving a temperature profile on the medium by using a light beam and detecting a first reproduction signal $h(t)=f(t)+\alpha^*f(t-\beta)$ containing both a signal component $f(t)$ obtained by a first backward magnetic wall movement toward a temperature peak position in the temperature profile and a signal component $\alpha^*f(t-\beta)$ obtained by a second forward magnetic wall movement toward the temperature peak position;

means for adjusting power of the light beam so that a delay amount $\beta$ is essentially an integer multiple of a recording code channel interval Tb;

means for detecting an amplitude ratio $\alpha$; and means for reproducing the information by comparing the first reproduction signal with a slice level of not less than two values in accordance with the detected amplitude ratio $\alpha$.

There is also provided a signal reproducing method of reproducing information by moving a magnetic wall on a magnetic recording medium, comprising the steps of:

giving a temperature profile on the medium by using a light beam and detecting a first reproduction signal $h(t)=f(t)+\alpha^*f(t-\beta)$ containing both a signal component $f(t)$ obtained by a first backward magnetic wall movement toward a temperature peak position in the temperature profile and a signal component $\alpha^*f(t-\beta)$ obtained by a second forward magnetic wall movement toward the temperature peak position;

adjusting power of the light beam so that a delay amount $\beta$ is essentially an integer multiple of a recording code channel interval Tb;

detecting an amplitude ratio $\alpha$; and reproducing the information by comparing the first reproduction signal with a slice level of not less than two values in accordance with the detected amplitude ratio $\alpha$.

Other features and advantages of the invention will become apparent from the following detailed description taken in conjunction with the accompanying drawings.

BRIEF DESCRIPTION OF THE DRAWINGS

FIGS. 4A, 4B, 4C, 4D and 4E are timing charts showing individual waveforms in the conventional magneto-optical recording/reproducing apparatus;

FIGS. 5A, 5B and 5C are views showing the operating principle of the conventional magneto-optical recording/reproducing apparatus;

FIGS. 8A, 8B, 8C, 8D, 8E, 8F, 8G, 8H and 8I are timing charts showing the operation of the embodiment of the present invention;

DETAILED DESCRIPTION OF THE PREFERRED EMBODIMENT

[First Embodiment]

Figure 7:
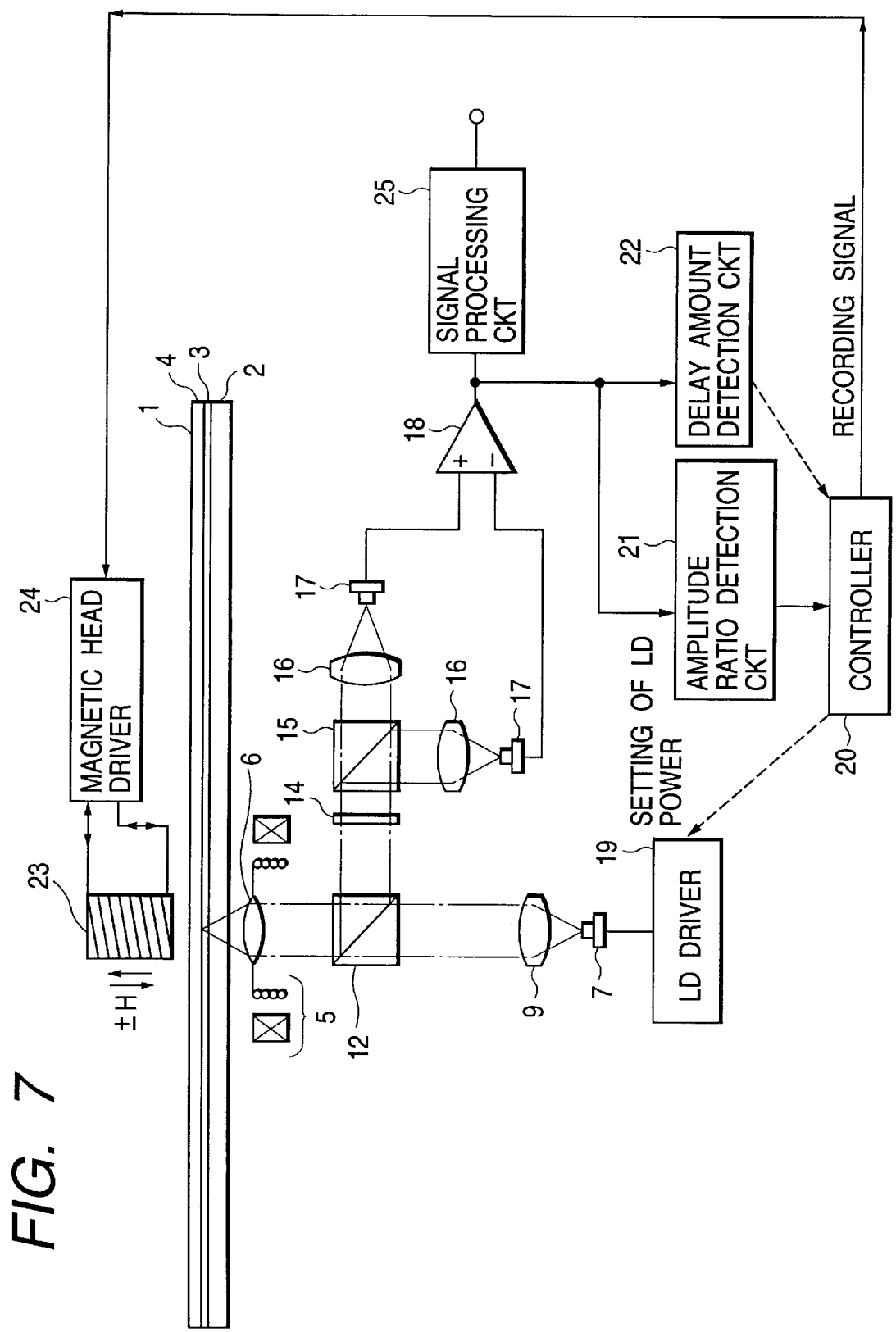
FIG. 7 is a view showing the arrangement of a magneto-optical recording/reproducing apparatus according to an embodiment of the present invention.

FIG. 7 shows the arrangement of a magneto-optical recording/reproducing apparatus according to the first embodiment of the present invention. Referring to FIG. 7, a magneto-optical disk 1 includes a substrate 2 made from glass or plastic, a magneto-optical recording medium 3 adhered to the substrate 2, and a protective layer 4 formed on the magneto-optical recording medium 3. The magneto-optical recording medium 3 is capable of moving magnetic walls of a recording mark in a reproduction layer, without changing recorded data in a recording layer, by using the temperature gradient of a medium temperature caused by irradiation of a light beam with respect to a magnetic domain in the recording medium, enlarging the magnetic domain in a reproducing spot, detecting a change in the plane of polarization of the reflected light of the light beam, and reproducing the recording mark. The magneto-optical disk 1 is supported by a spindle motor by means of, e.g., magnet chucking (not shown) and can be rotated around a rotating shaft.

Elements 5 to 7, 9, 12, and 14 to 17 are parts constituting an optical head for irradiating laser light onto the magneto-optical disk 1 and obtaining information from the reflected light. The element 6 is a condenser lens, and the element 5 is an actuator for driving the condenser lens 6. The element 7 is a semiconductor laser, the element 9 is a collimator lens, the element 12 is a beam splitter, the element 14 is a $\lambda/2$ plate, and the element 15 is a polarizing beam splitter. The elements 17 are photosensors, and the elements 16 are condenser lenses for the photosensors 17. A differential amplifier 18 differentially amplifies signals focused and detected in accordance with the polarizing directions.

In the magneto-optical recording/reproducing apparatus with the above arrangement, a laser beam emitted from the semiconductor laser 7 is irradiated on the magneto-optical disk 1 via the collimator lens 9, the beam splitter 12, and the condenser lens 6. The condenser lens 6 is so controlled by the actuator 5 as to move in a focusing direction and a tracking direction to sequentially focus the laser beam on the magneto-optical recording medium 3. The condenser lens 6 also tracks along guide grooves formed on the magneto-optical disk 1. The optical path of the laser beam reflected by the magneto-optical disk 1 is changed in the direction of the polarizing beam splitter 15 by the beam splitter 12. The light beam is focused on the photosensors 17 by the condenser lenses 16, in accordance with the polarity of magnetization in the magneto-optical recording medium, via the $\lambda/2$ plate 14 and the polarizing beam splitter 15. The differential amplifier 18 differentially amplifies the outputs from the photosensors 17 and outputs a magneto-optical signal.

A controller 20 inputs a recording signal to be recorded and also receives, e.g., the rotational speed, recording radius, and recording sector of the magneto-optical disk 1 as input information and outputs the recording power of the semiconductor laser 7 and the recording signal, thereby controlling an LD driver 19 and a magnetic head driver 24. The LD driver 19 drives the semiconductor laser 7 and controls desired recording power and reproducing power in this embodiment.

A magnetic head 23 applies a modulated magnetic field to a laser irradiated portion of the magneto-optical disk 1 during recording. The magnetic head 23 is arranged to oppose the condenser lens 6 with the magneto-optical disk 1 interposed between them. In recording, the recording/reproducing semiconductor laser 7 is driven by the LD driver 19 to irradiate the recording laser power by DC light. At the same time, the magnetic head 23 is driven by the magnetic head driver 24 to generate a magnetic field having a different polarity in accordance with a recording signal. Also, this magnetic head 23 moves in the radial direction of the magneto-optical disk 1 in synchronism with the optical head. In recording, the magnetic head 23 sequentially applies a magnetic field to laser irradiated portions of the magneto-optical recording medium 3, thereby recording information.

A delay amount detection circuit 22 detects a delay amount $\beta$ between a signal: $f(t)$ generated when a magnetic wall moves from the front end of a critical temperature region of magnetic wall movement, which is formed by the reproducing light beam as an output from the differential amplifier 18, to a maximum temperature point and a signal: $\alpha \times f(t-\beta)$ generated when a magnetic wall moves from the rear end of the critical temperature region to the maximum temperature point. An amplitude ratio detection circuit 21 detects a as an amplitude ratio of $f(t)$ to $\alpha \times f(t-\beta)$.

Figure 9A:
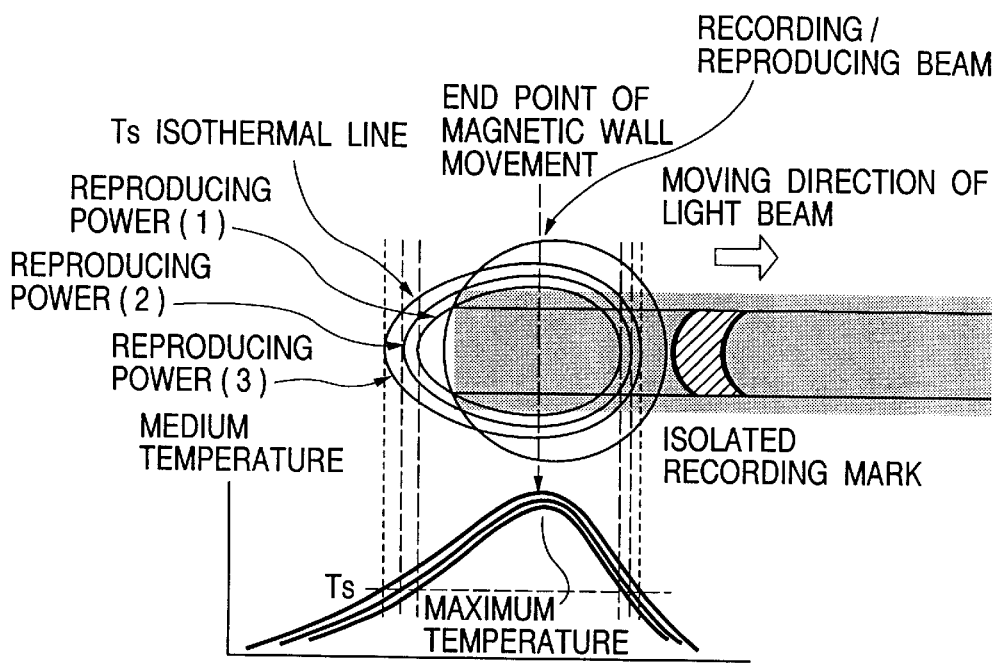
FIGS. 9A and 9B are views showing a portion of a medium track and the operating principle by using reproduction signal waveforms in the present invention.
Figure 9B:
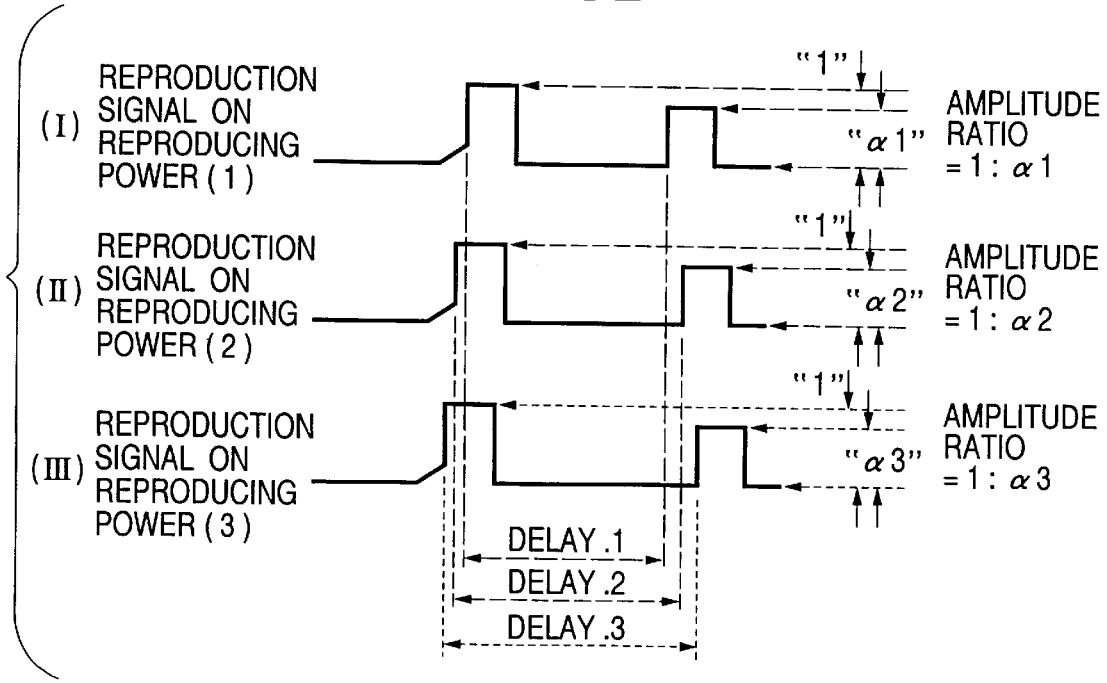

The operating principle of the present invention in the magneto-optical recording/reproducing apparatus with the above arrangement and function will be described below. First, the behavior of a reproduction signal in the magnetic wall movement medium as the basis of this embodiment and the principle of the present invention will be described with reference to FIGS. 9A and 9B. FIG. 9A shows the temperature profile of a medium temperature with respect to a domain arrangement in the magnetic medium obtained by a reproducing light beam when the light beam moves to the right and the magneto-optical disk 1 moves to the left in FIG. 9A. FIG. 9B shows three states (reproducing power 1, reproducing power 2, and reproducing power 3) when the reproducing power of the semiconductor laser 7 is changed. In FIG. 9A, a $T_s$ isothermal line is the isothermal line of a temperature at which the magnetic coupling between a recording layer for holding recorded information and a reproduction layer, which can enlarge and reproduce a magnetic domain by moving magnetic walls, is broken. The $T_s$ isothermal line is a principal condition by which a magnetic wall starts moving.

It is basically considered that a magnetic wall starts moving when the magnetic wall enters this temperature region. The positional relationship between this $T_s$ isothermal line and a light beam spot largely depends upon the thermal characteristic of the recording medium and also changes in accordance with the relative speed of the light beam and the recording medium, i.e., a so-called linear velocity. A magnetic wall entering this $T_s$ isothermal line moves to a maximum temperature point where the magnetic wall is energetically most stable. Furthermore, as shown in FIG. 9A, not only a magnetic wall moves backward along the moving direction of the light beam toward the maximum temperature point, but also a magnetic wall moves toward the maximum temperature point from the $T_s$ isothermal line behind the light beam. Therefore, when an isolated recording mark indicated as a hatched portion in FIG. 9A is reproduced, (I) reproduction signal 1, (II) reproduction signal 2, and (III) reproduction signal 3 are obtained, as shown in FIG. 9B, with respect to the three reproducing powers described above. Note that these reproducing powers have a relation of reproducing power 1<reproducing power 2<reproducing power 3.

The behaviors of these reproduction signals will be described below. When the light beam moves in the direction shown in FIG. 9A, a recording mark magnetic wall starts moving in the front region of the $T_s$ temperature region, and a signal waveform rises for the first time. When the light beam keeps moving, a magnetic wall at the rear end of the recording mark starts moving to cause disappearance of a magnetic domain in the reproduction layer, and the reproduction signal falls. Since the moving velocity of the magnetic wall is much higher than the moving velocity of the light beam, both the leading and trailing edges of the signal waveform are steep, so the reproduction waveform becomes rectangular. When the light beam further moves and the recording mark reaches the rear end of the $T_s$ temperature region, the magnetic domain of the recording layer is transferred to the reproduction layer and at the same time the magnetic wall moves to the maximum temperature point. Consequently, the reproduction signal rises for the second time. A delay time amount in this case is a time equivalent to the distance between the front and rear ends of the $T_s$ isothermal line. When the light beam moves further, a non-recording mark magnetic domain is transferred to the reproduction layer and simultaneously the magnetic wall moves. As a consequence, the magnetic domain in the light beam disappears from the reproduction layer, the reproduction signal falls, and the isolated recording mark reproducing operation is complete.

As described above, the delay amount between the first and second leading edges of the reproduction signal is related to the size of the $T_s$ temperature region. Therefore, as shown in FIG. 9B, the three reproducing powers have different delay amounts 1 to 3. Also, assuming the amplitude of the first leading edge of the reproduction signal is 1, the amplitude of the second leading edge of the signal with respect to the first amplitude changes in accordance with changes in the region and gradient of the temperature profile in the light beam and with the temperature dependence of the Kerr effect of the magneto-optical recording film. From these phenomena, assuming that a signal component obtained by the magnetic wall movement from the front of the reproducing beam is $f(t)$, a signal component obtained by the magnetic wall movement from the rear of the reproducing beam is represented by $\alpha \times f(t-\beta)$ ($\beta$: delay amount, $\alpha$: amplitude ratio). A reproduction signal $h(t)$ is the sum of these signal components, i.e., $h(t)=f(t)+\alpha \times f(t-\beta)$.

Figure 10:
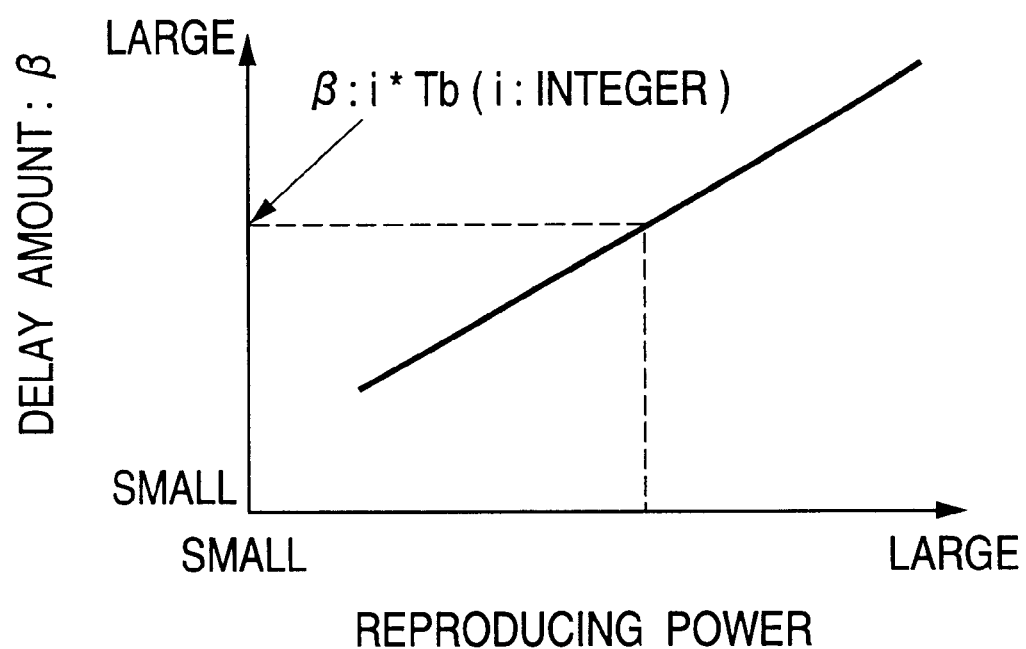
FIG. 10 is a graph showing the operating principle, in which a delay amount is illustrated as a function of a reproducing power by the operation of the present invention.

In other words, the delay amount: $\beta$ can be adjusted by the reproducing power, and consequently the amplitude ratio: $\alpha$ is uniquely determined by the intensity of the reproducing power and by the thermal characteristic and temperature gradient of the magneto-optical disk. This embodiment is characterized in that the above phenomenon which is usually regarded as a problem is effectively used to reproduce information from a reproduction signal. As shown in FIG. 10, the relationship between the reproducing power and the delay amount: $\beta$ is that the delay amount: $\beta$ nearly monotonously increases with increasing reproducing power. Accordingly, assuming the channel interval of a recording code is Tb, a reproducing power by which delay amount $\beta=i \times Tb$ (i: integer) exists.

Figure 11A:
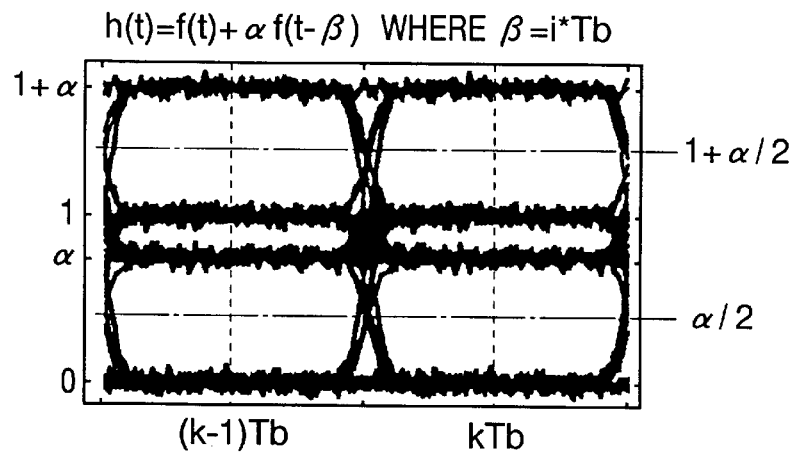
FIGS. 11A, 11B and 11C are views showing eye patterns in the embodiment of the present invention.
Figure 11B:
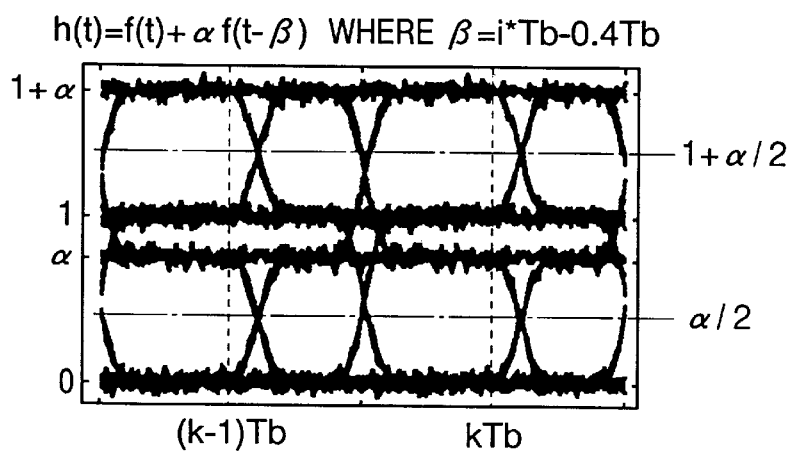
Figure 11C:
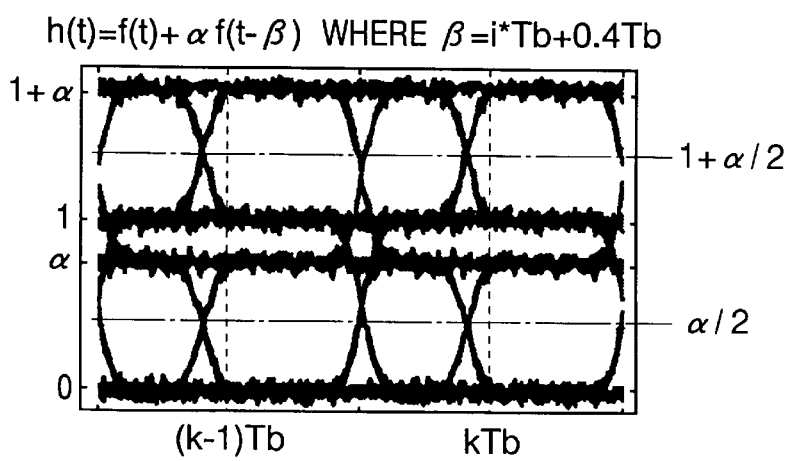

FIGS. 11A to 11C show eye patterns obtained when pseudo random data is recorded and reproduced. FIG. 11A shows a case in which the reproducing power is so adjusted that the delay amount β is an integer multiple of the recording code channel, i.e., β=i×Tb (i: integer). FIG. 11B shows a case in which the reproducing power is so adjusted that the delay amount β satisfies=(i−0.4)×Tb (i: integer). FIG. 11C shows a case in which the reproducing power is so adjusted that the delay amount β satisfies β=(i+0.4)×Tb (i: integer). In FIGS. 11A to 11C, (k−1)Tb and kTb on the abscissa of the eye pattern represent data identification points. Comparing FIGS. 11A to 11C reveals that the detection margin is a maximum when the amplitude of the reproduction signal is divided into three values, a level of "0", a level of "1" and "α", and a level of "1+α", bounded by levels α/2 and 1+α/2. In other words, the reproduction signal level can be detected most accurately by detecting it at these three values when the amplitude ratio α satisfies 0.5≦α≦1.5. The data identification points (k−1)Tb and kTb on the abscissa will be described below. Referring to FIG. 11A, the level of the reproduction signal changes at times most separated from the data identification points (k−1)Tb and kTb. In contrast, in FIGS. 11B and 11C the level of the reproduction signal changes at times close to the data identification points. Additionally, this level change crosses the data identification levels α/2 and 1+α/2. Therefore, when the delay amount β is set as close to an integer multiple of the recording code channel width as possible, the reproduction signal level can be identified with a wider margin at the data identification points.

The delay adjusting method will be additionally explained below. The delay amount adjustment is achieved by the delay amount detection circuit 22, the controller 20, and the LD driver 19. The adjustment of the delay amount α can be previously determined as an inherent value of a recording medium. However, when the combination of a magneto-optical recording/reproducing apparatus and a recording medium is taken into consideration, it is desirable to execute the adjustment as a recording test by using or providing a predetermined recording test region, since the thermal distribution of a reproducing light beam and the thermal characteristic of a recording medium have variations.

In this embodiment, as a means for adjusting the delay amount β, a repeating pattern of isolated recording marks separated by a distance about twice a predicted delay amount β is used. When an isolated recording mark is recorded as shown in FIG. 9A, two rectangular reproduction pulses appear in the reproduction signal as in FIG. 9B. The delay amount detection circuit 22 comprises a phase comparator as its main constituent. The delay amount detection circuit 22 compares the phases of the leading edges of the two reproduction pulses with the phase of a reference clock having the same frequency as the recording code channel, and outputs the difference between the respective phase differences from the reference clock to the controller 20. On the basis of this output from the delay amount detection circuit 22, the controller 20 sends information for changing the reproducing power to the LD driver 19, thereby changing the reproducing power. As shown in FIG. 10, the relationship between the reproducing power and the delay amount is supposed to be uniquely determined. However, this relationship changes in accordance with, e.g., the characteristics of a light beam of a reproducing apparatus and the state of focus servo control. Therefore, when a variation resulting from the combination of a reproducing apparatus and a recording medium is taken into account, it is desirable to determine the final reproducing power by using this reproducing power value as an initial value and performing feedback control by repeating reproducing power correction, without depending only upon the relationship between the reproducing power and the delay amount.

After the delay amount is adjusted to be close to an integer multiple of the period of the recording code channel as described above, the amplitude ratio α of the two reproduction pulses in isolated waveform reproduction is detected by the amplitude detection circuit 21 in FIG. 7. This is accomplished by sampling the reproduction signal at time delayed by Tb/2 from the leading edges of the two reproduction pulses and calculating the amplitude ratio α from this data. From this amplitude ratio α, the levels α/2 and 1+α/2 as the references of the ternary level determination of sampling data are determined.

Actual information recording and reproduction will be described below with reference to the timing charts in FIGS. 8A to 8I. FIG. 8A shows an information data system string $\{a_k\}$. FIG. 8B shows a recording signal system string $\{b_k\}$ converted, for recording, from the recording information data system string $\{a_k\}$. FIG. 8C shows a recording power applied to the semiconductor laser 7. FIG. 8D shows a modulated magnetic field generated by the magnetic head 23. FIG. 8E shows a recording mark string recorded in a recording medium. FIG. 8F shows a reproduction signal obtained from the differential amplifier 18. FIG. 8G shows sampling points at which the level of the reproduction signal is identified. FIG. 8H shows a sampling point signal string, represented by three values, of the reproduction signal. FIG. 8I shows a reproduction data string obtained from the reproduction signal.

When input data as shown in FIG. 8A is to be recorded, it is possible to directly record this recording data, sample the reproduction signal to perform ternary determination, and read out the data. If this is the case, however, it is necessary to calculate the reproduction data on the basis of two readout signals subjected to ternary determination at sampling points separated by a time interval corresponding to the delay amount described above. That is, assuming that the channel interval is Tb and the delay amount β is β=i×Tb, reproduction data $y_k$ at a sampling point k can be expressed by $y_k=(y_{k-i}+d_k)\mod 2$ (mod2 represents a remainder obtained by division by 2) by using sampling data $d_k$ subjected to ternary determination. However, the reproduction data $y_k$ contains a feedback loop for determining data on the basis of $y_{k-i}$ determined previously. Therefore, if a read error occurs in $y_{k-i}$, this error successively propagates to pose a problem. A general known approach for preventing this inconvenience is to perform pre-coder processing for this characteristic before recording it. Assuming a recording data system string is $\{a_k\}$ and a pre-coder output system string, i.e., a recording signal system string is $\{b_k\}$, $b_k$ can be expressed by $b_k=(a_k+b_{k-i})\mod 2$. The recording signal system string $\{b_k\}$ in FIG. 8B shows a case where pre-coding is performed when i=4, i.e., β=4×Tb.

In recording data subjected to the pre-coding processing as described above, at the same time the recording operation is started the laser power is set to a predetermined recording power and the modulated magnetic field (FIG. 8D) based on the recording signal is applied. By these operations, the recording mark string (FIG. 8E) is formed in the cooling process of the recording medium. Note that hatched portions represent magnetic domains having a direction of magnetization corresponding to the recording mark described in this specification, and halftone portions represent magnetic domains having an opposite direction of magnetization. In this embodiment, a reproduction signal as shown in FIG. 8F is obtained when this recording mark is reproduced. As described earlier, this reproduction signal is a superposed signal of a signal obtained by magnetic wall movement from the front of the reproducing beam and a signal obtained by magnetic wall movement from the rear of the reproducing beam, and takes four values, "0", "α", "1", and "1+α". This reproduction signal in FIG. 8F is sampled at the timings shown in FIG. 8G, and ternary levels are determined by the identification levels α/2 and 1+α/2 as described above. Consequently, a sampling point signal string as shown in FIG. 8H is obtained. The reproduction data string in FIG. 8I is obtained by performing mod2 processing for this sampling point signal string in FIG. 8H. This reproduction data string in FIG. 8I and the recording information data system string in FIG. 8A agree with each other, indicating that the recorded data can be read out. This conversion from the reproduction signal in FIG. 8F to the reproduction data string in FIG. 8I is processed by a signal processing circuit 25.

Figure 12A:
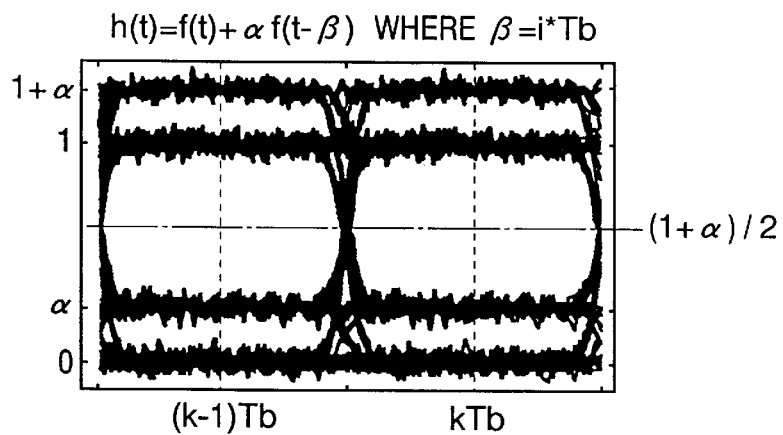
FIGS. 12A, 12B and 12C are supplementary views showing eye patterns in the embodiment of the present invention.
Figure 12B:
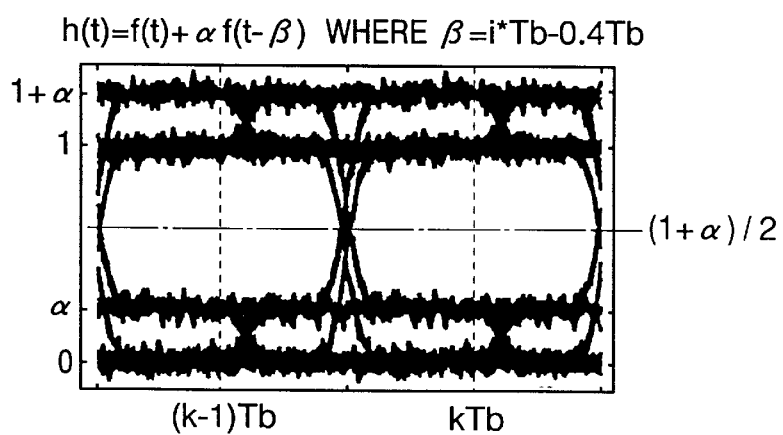
Figure 12C:
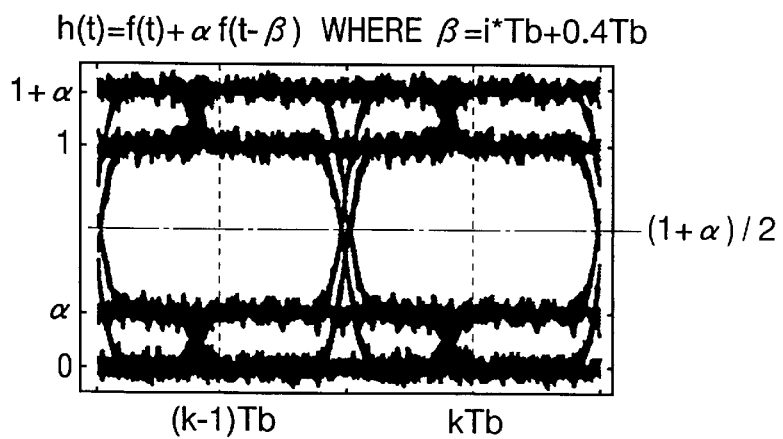

A case where the amplitude ratio α satisfies α≦0.5 will be supplementarily described below. FIGS. 12A to 12C show eye patterns obtained when pseudo random data is recorded and reproduced. FIG. 12A shows a case in which the reproducing power is so adjusted that the delay amount β is an integer multiple of the recording code channel, i.e., β=i×Tb (i: integer). FIG. 12B shows a case in which the reproducing power is so adjusted that the delay amount β satisfies β=(i−0.4)×Tb (i: integer). FIG. 12C shows a case in which the reproducing power is so adjusted that the delay amount β satisfies β=(i+0.4)×Tb (i: integer). In FIGS. 12A to 12C, (k−1)Tb and kTb on the abscissa of the eye pattern represent data identification points. Comparing FIGS. 12A to 12C reveals that the detection margin is a maximum when the amplitude of the reproduction signal is divided into two values, a level "0" and "α" and a level of "1" and "1+α", bounded by a level (1+α)/2. In other words, the reproduction signal level can be detected most accurately by detecting it at these two values when the amplitude ratio α satisfies α≦0.5. The data identification points (k−1)Tb and kTb on the abscissa will be described below. Referring to FIG. 12A, the level of the reproduction signal changes at times most separated from the data identification points (k−1)Tb and kTb. In contrast, in FIGS. 12B and 12C, the level of the reproduction signal changes at times close to the data identification points. However, as is apparent from FIGS. 12A to 12C, a change in the reproduction signal level does not exceed the data identification level (1+α)/2 and has no influence on the binary detection.

Accordingly, binary level detection is preferable when the amplitude ratio α satisfies α≦0.5, and a change in the delay amount β has no influence on the accuracy of the binary detection. That is, any conventional detection method can be applied.

Note that $\{b_k\}$ in the pre-coding processing using the amplitude ratio α, the delay amount β, and the channel interval Tb, the slice levels for the ternary determination, the slice levels for quaternary determination, and the recording power of the semiconductor laser can be easily calculated by running the programs of a CPU used in the controller.

Note also that the pre-coding processing means is provided in the controller 20. The result of the processing is transmitted as a recording signal system string to the LD driver 19. This recording signal system string is transmitted to the magnetic head driver to apply a modulated magnetic field from the magnetic head. It is also possible to provide the pre-coding processing means in the LD driver 19 and the magnetic head driver 24 and transmit a data system string from the controller 20.

The magneto-optical recording/reproducing medium in the above embodiment has been described by taking a magneto-optical disk as an example. However, the present invention is similarly applicable to some other medium, such as a magneto-optical card, or to another form.

In the present invention as has been described above, a heating semiconductor laser for producing a heating beam can be omitted. Accordingly, it is possible to omit parts such as a collimator lens and a dichroic mirror from an optical system. Additionally, the adjustment process during assembly of an apparatus can be shortened, and various costs can be reduced because a single semiconductor laser is used.

Figure 1:
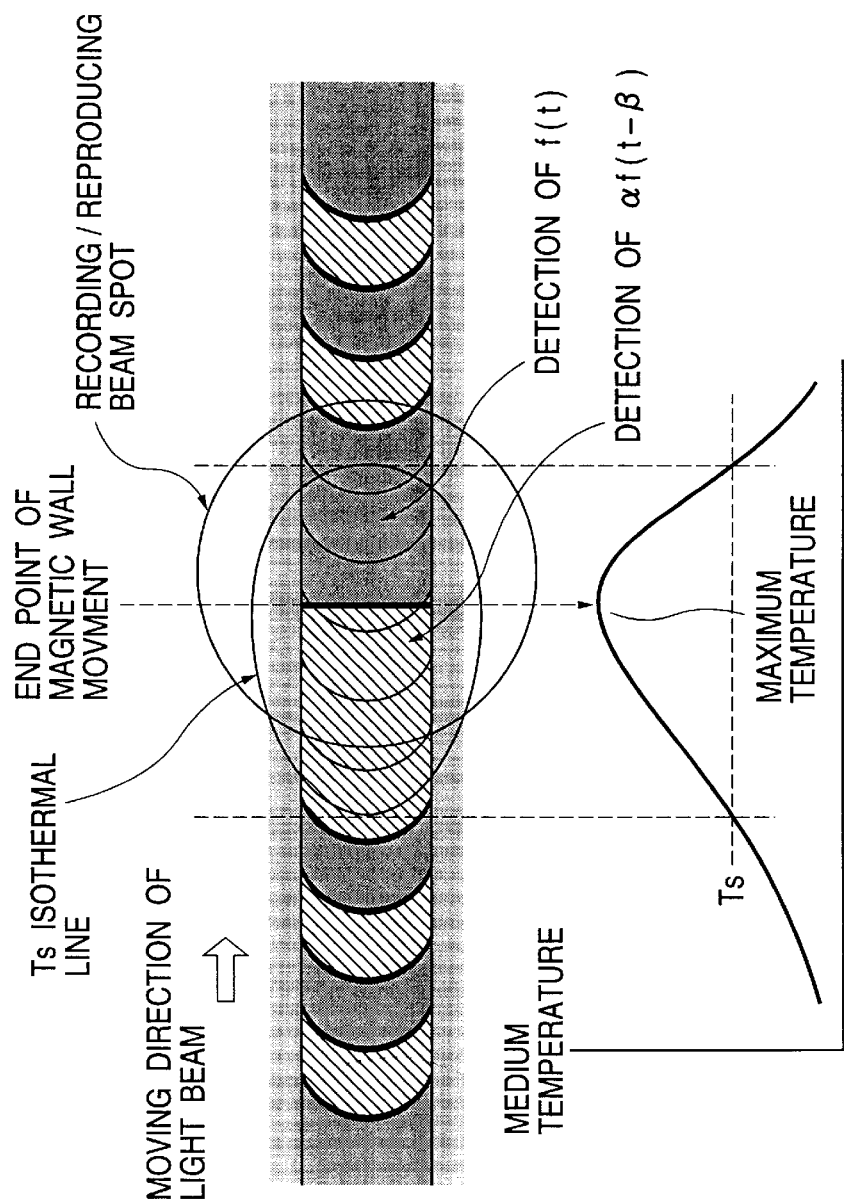
FIG. 1 is a view showing the operating principle when a single beam is used.
Figures 2A, 2B, 2C:
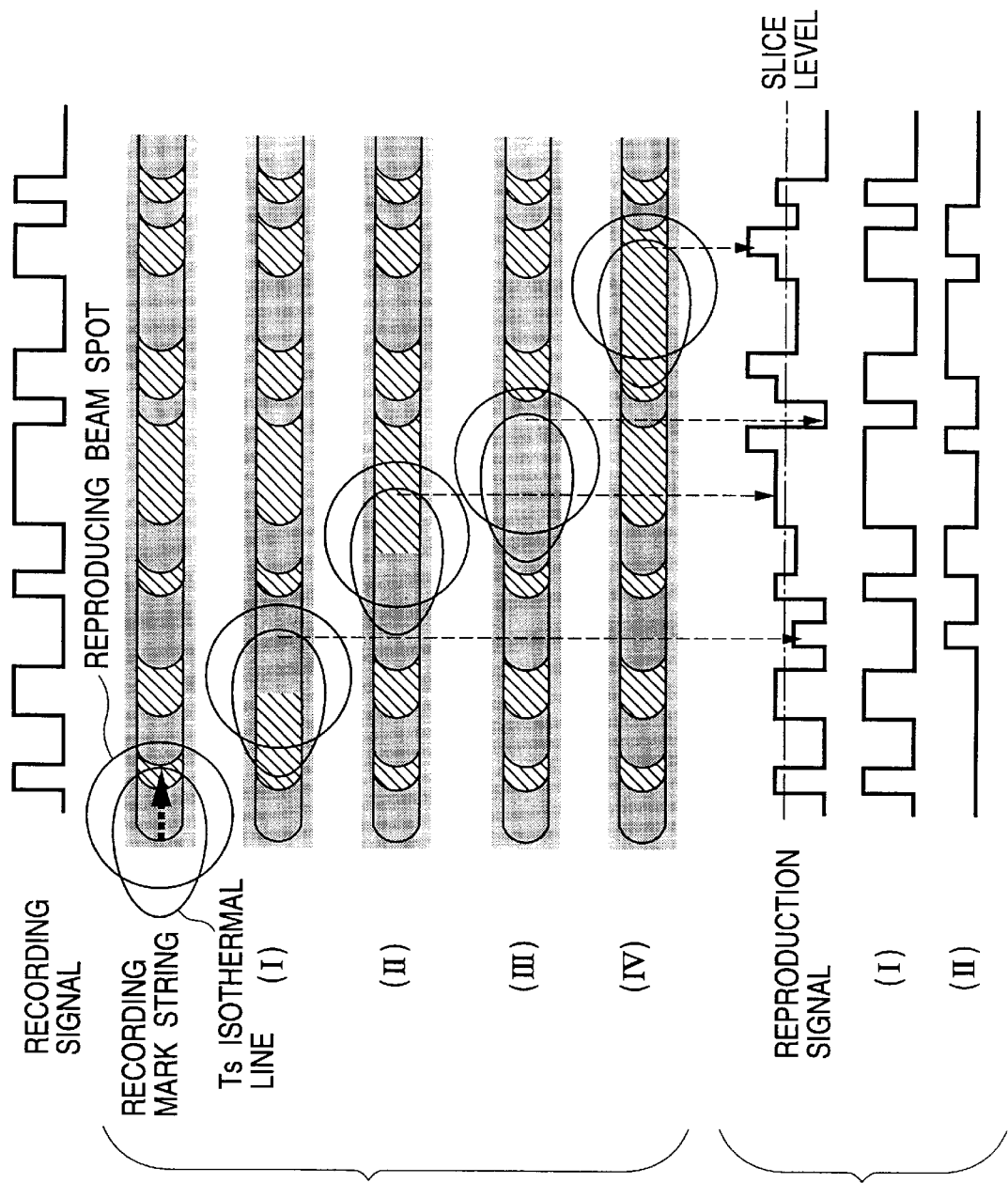
FIGS. 2A, 2B and 2C are views showing a reproduction signal detected when a single beam is used.
Figure 3:
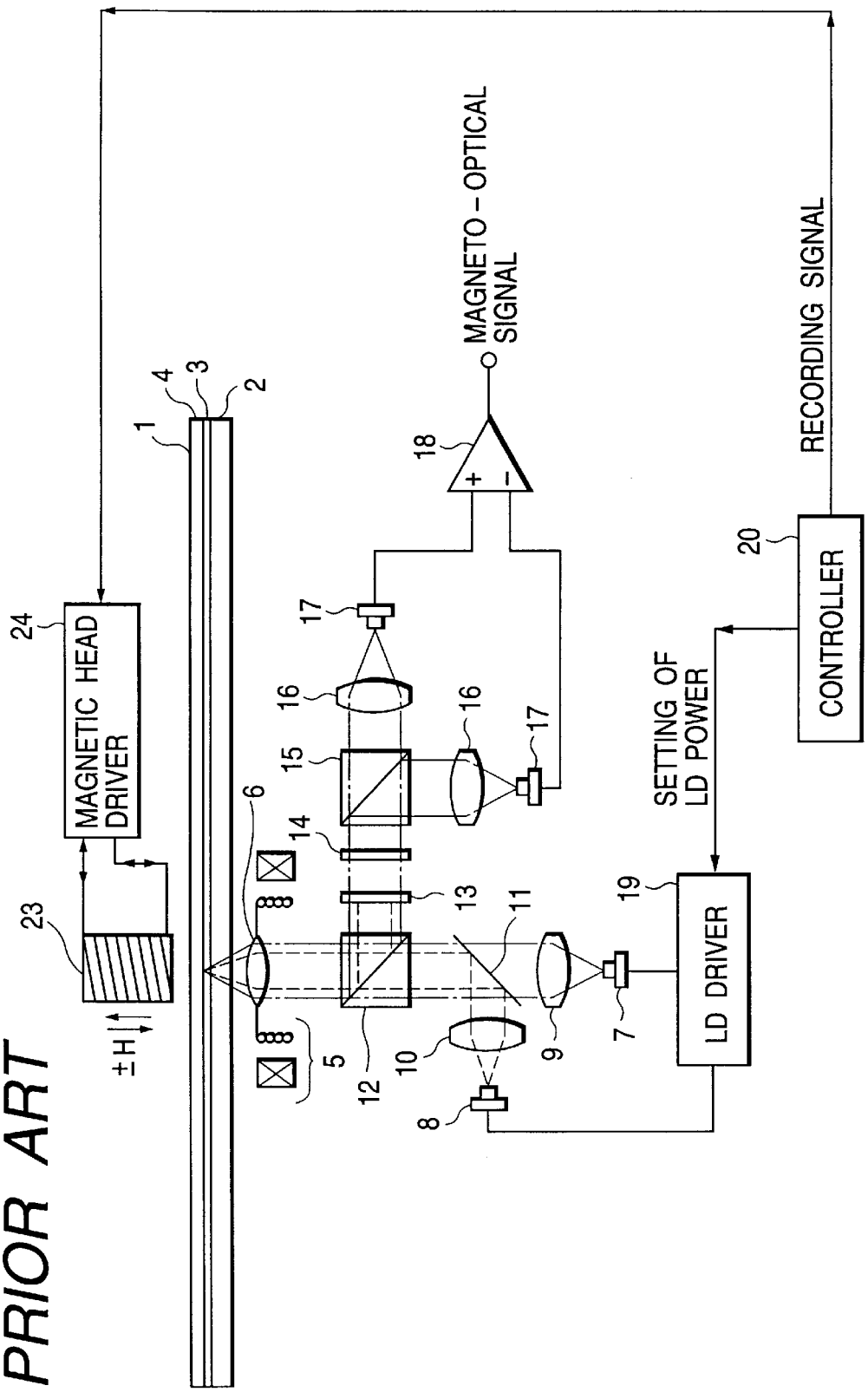
FIG. 3 is a schematic view showing the arrangement of a conventional magneto-optical recording/reproducing apparatus (signal reproducing apparatus)
Figure 6:
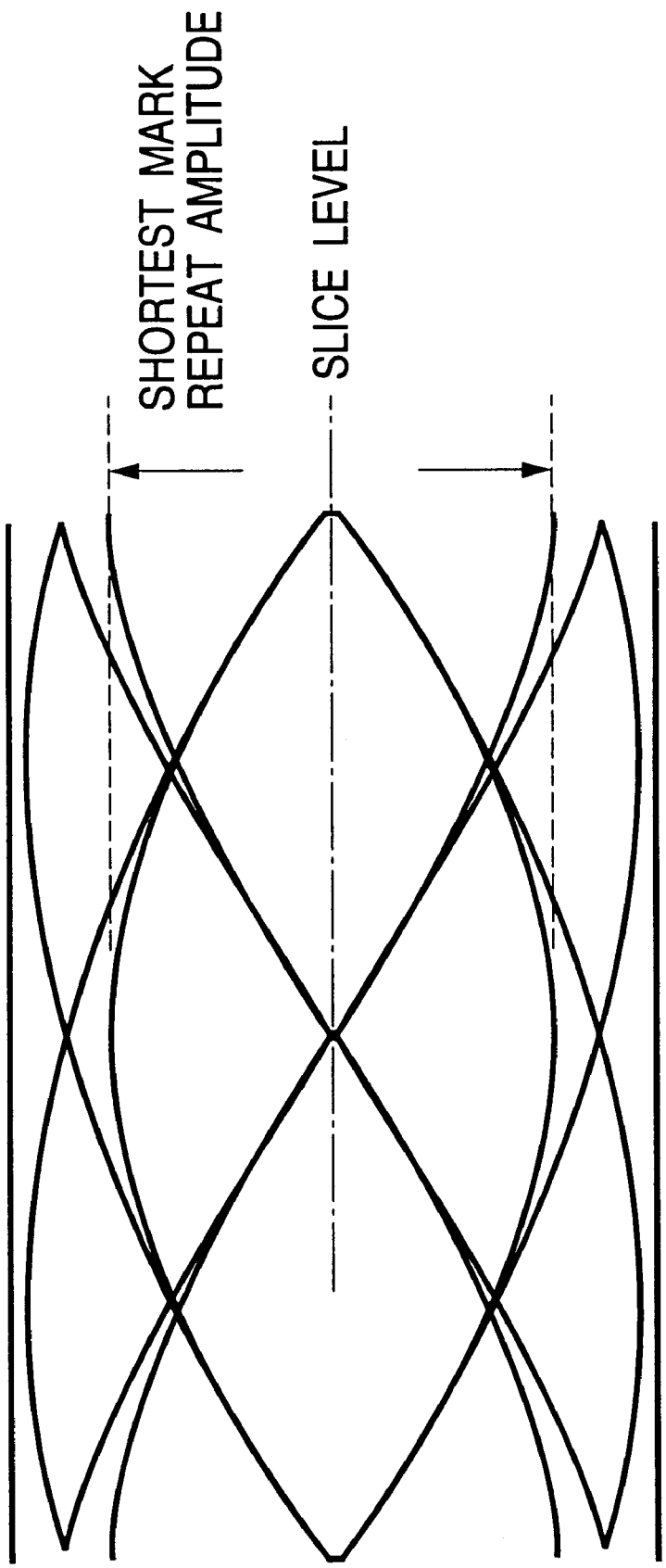
FIG. 6 is a view showing a principle eye pattern of binarization setting in the conventional magneto-optical recording/reproducing apparatus.

Furthermore, recorded information can be accurately reproduced even with the use of a synthetic signal generated by a single reproducing beam as shown in FIG. 1.

What is claimed is:

1. A signal reproducing apparatus for reproducing information by moving a magnetic wall on a magnetic recording medium, comprising:

reproducing means for giving a temperature profile on said medium by using a light beam and detecting a first reproduction signal h(t)=f(t)+α*f(t−β) containing both a signal component f(t) obtained by a first backward magnetic wall movement toward a temperature peak position in the temperature profile and a signal component α*f(t−β) obtained by a second forward magnetic wall movement toward the temperature peak position;

means for adjusting power of the light beam so that a delay amount β is essentially an integer multiple of a recording code channel interval Tb;

means for detecting an amplitude ratio α; and means for setting a slice level in accordance with the detected amplitude ratio α and reproducing the information by comparing the first reproduction signal with the slice level.

2. An apparatus according to claim 1, wherein the information is subjected to pre-coding processing before being recorded on said medium by taking error propagation into account.

3. An apparatus according to claim 2, wherein hen the amplitude ratio α satisfies 0.5≦α≦1.5, each of two levels α/2 and 1+α/2 is used as the slice level.

4. An apparatus according to claim 3, wherein when the amplitude ratio is α≦0.5, (1+α)/2 is used as the slice level.

5. A signal reproducing method of reproducing information by moving a magnetic wall on a magnetic recording medium, comprising the steps of:

giving a temperature profile on said medium by using a light beam and detecting a first reproduction signal h(t)=f(t)+α*f(t−β) containing both a signal component f(t) obtained by a first backward magnetic wall movement toward a temperature peak position in the temperature profile and a signal component α*f(t−β) obtained by a second forward magnetic wall movement toward the temperature peak position;

adjusting power of the light beam so that a delay amount β is essentially an integer multiple of a recording code channel interval Tb;

detecting an amplitude ratio α; and setting a slice level in accordance with the detected amplitude ratio α and reproducing the information by comparing the first reproduction signal with the slice level.

6. A signal reproducing apparatus according to claim 1 further comprising a semiconductor laser for emitting the light beam, and a condenser lens for condensing the light beam emitted from the semiconductor laser.

7. A signal reproducing method according to claim 5, wherein said light beam is emitted from a semiconductor laser and is condensed by a condenser lens.

8. A signal reproducing apparatus according to claim 1 further comprising means for detecting said delay amount $\beta$.

9. A signal reproducing apparatus according to claim 1, wherein said magnetic recording medium is a magneto-optical disk, and said signal reproducing apparatus further comprises a spindle motor for rotating the magneto-optical disk.

* * * * *

UNITED STATES PATENT AND TRADEMARK OFFICE
CERTIFICATE OF CORRECTION

PATENT NO. : 6,058,077
DATED : May 2, 2000
INVENTOR(S) : Yasuyuki Miyaoka

It is certified that error appears in the above-identified patent and that said Letters Patent is hereby corrected as shown below:

Title page,
Item [56], References Cited:

U.S PATENT DOCUMENTS, insert
-- 5,936,915   8/1999   Fujii et al.         369/13
   5,831,943   11/1998  Kurita et al.        369/13
   5,862,103   1/1999   Matsumoto et al.  369/13 --.

Item [57], ABSTRACT,
Line 3, "profiled" should read -- profile --.

Drawings,
Sheet 1, FIG. 1, "MOVMENT" should read -- MOVEMENT --.

Column 5,
Line 61, "principle" should read -- principal --.

Column 7,
Line 33, "detects a" should read -- detects $\alpha$ --.

Column 9,
Line 2, "pseudo random" should read -- pseudo-random --;
Line 7, "satisfies=(i-0.4)" should read -- satisfies $\beta$= (i-0.4) --; and
Line 34, "amount $\alpha$" should read -- amount $\beta$ --.

Column 11,
Line 21, "pseudo random" should read -- pseudo-random --.

UNITED STATES PATENT AND TRADEMARK OFFICE
CERTIFICATE OF CORRECTION

PATENT NO. : 6,058,077
DATED : May 2, 2000
INVENTOR(S) : Yasuyuki Miyaoka

It is certified that error appears in the above-identified patent and that said Letters Patent is hereby corrected as shown below:

<u>Column 12,</u>
Line 42, "hen" should read -- when --.

Signed and Sealed this

Eighth Day of January, 2002

Attest:

JAMES E. ROGAN
Attesting Officer     Director of the United States Patent and Trademark Office